Jan. 13, 1970  KATSUJI HIRAHARA ET AL  3,488,976
FROZEN PRODUCT MACHINE
Filed May 6, 1968  14 Sheets-Sheet 1
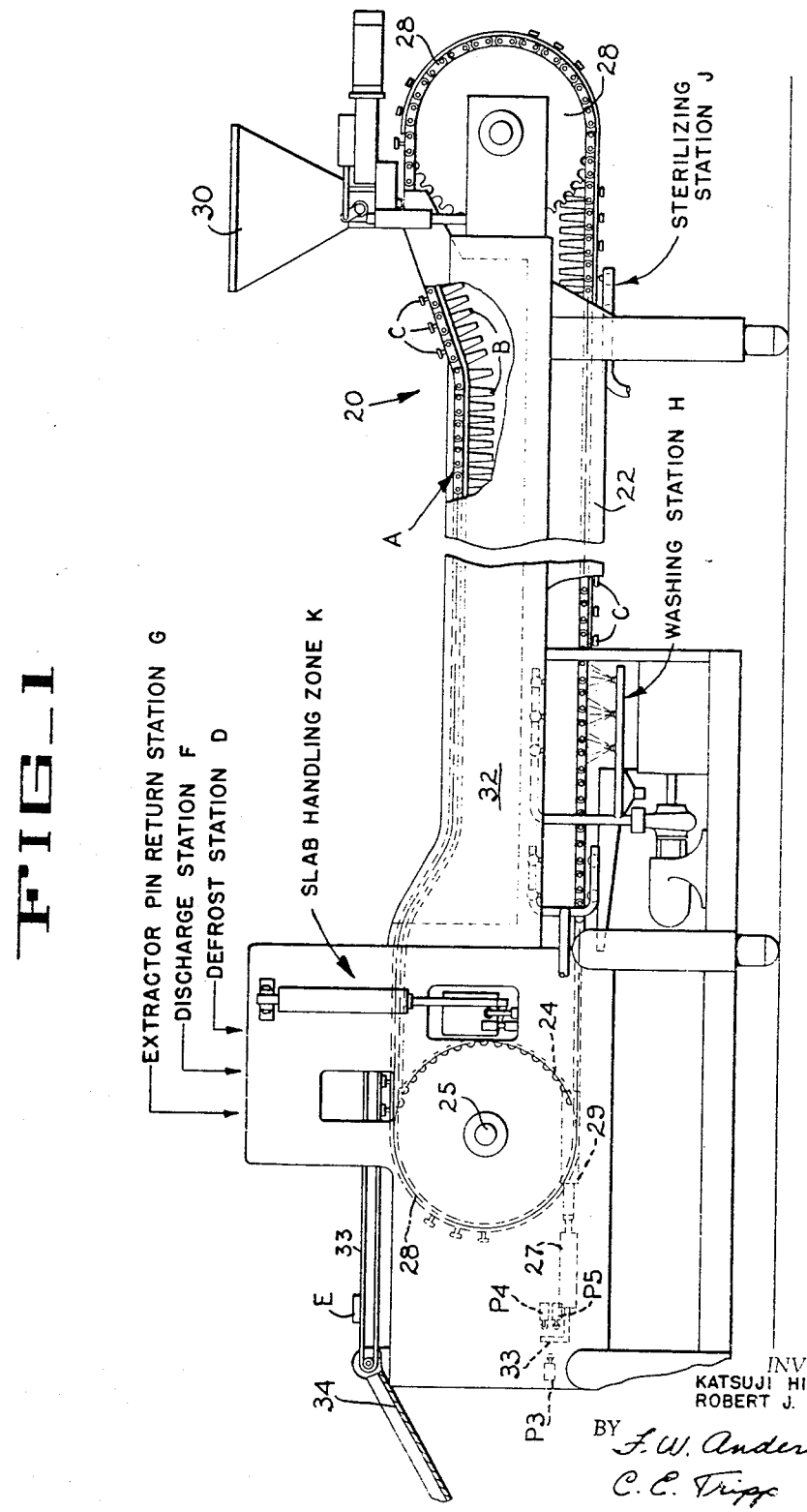
INVENTORS
KATSUJI HIRAHARA
ROBERT J. BETSCHART
BY F. W. Anderson
C. C. Tripp
ATTORNEYS

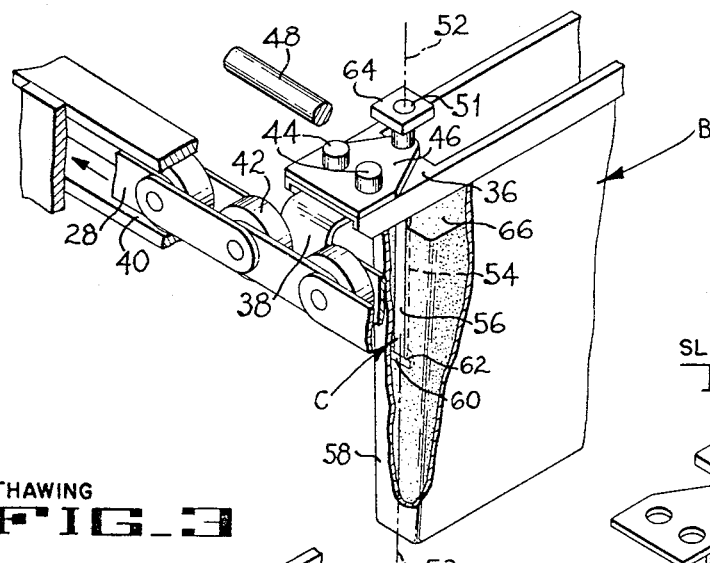
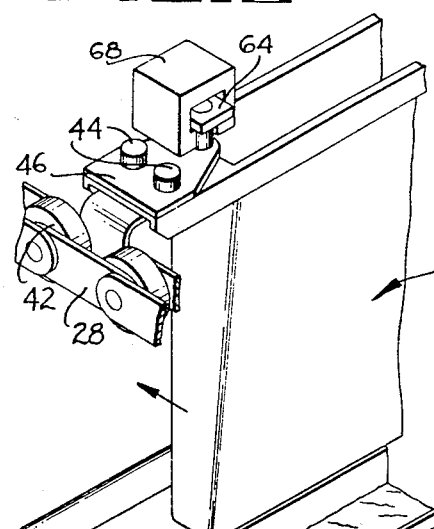
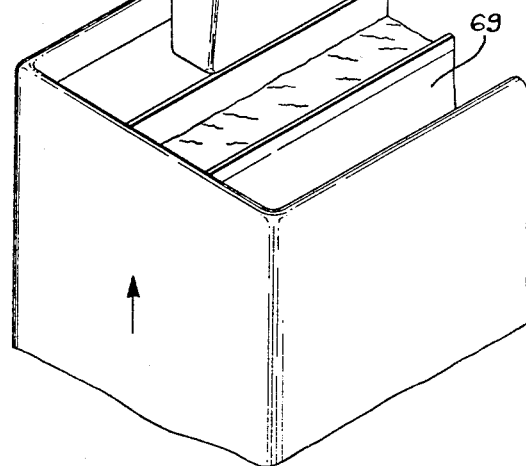
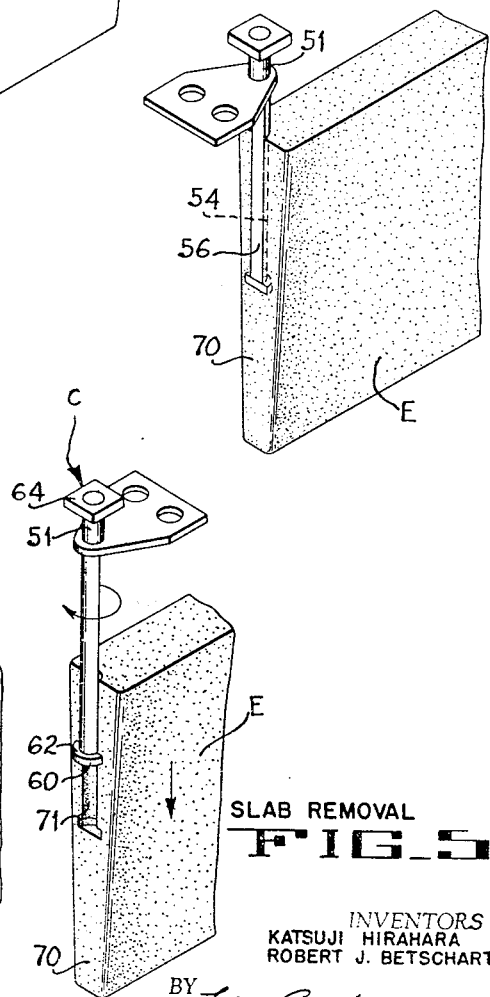

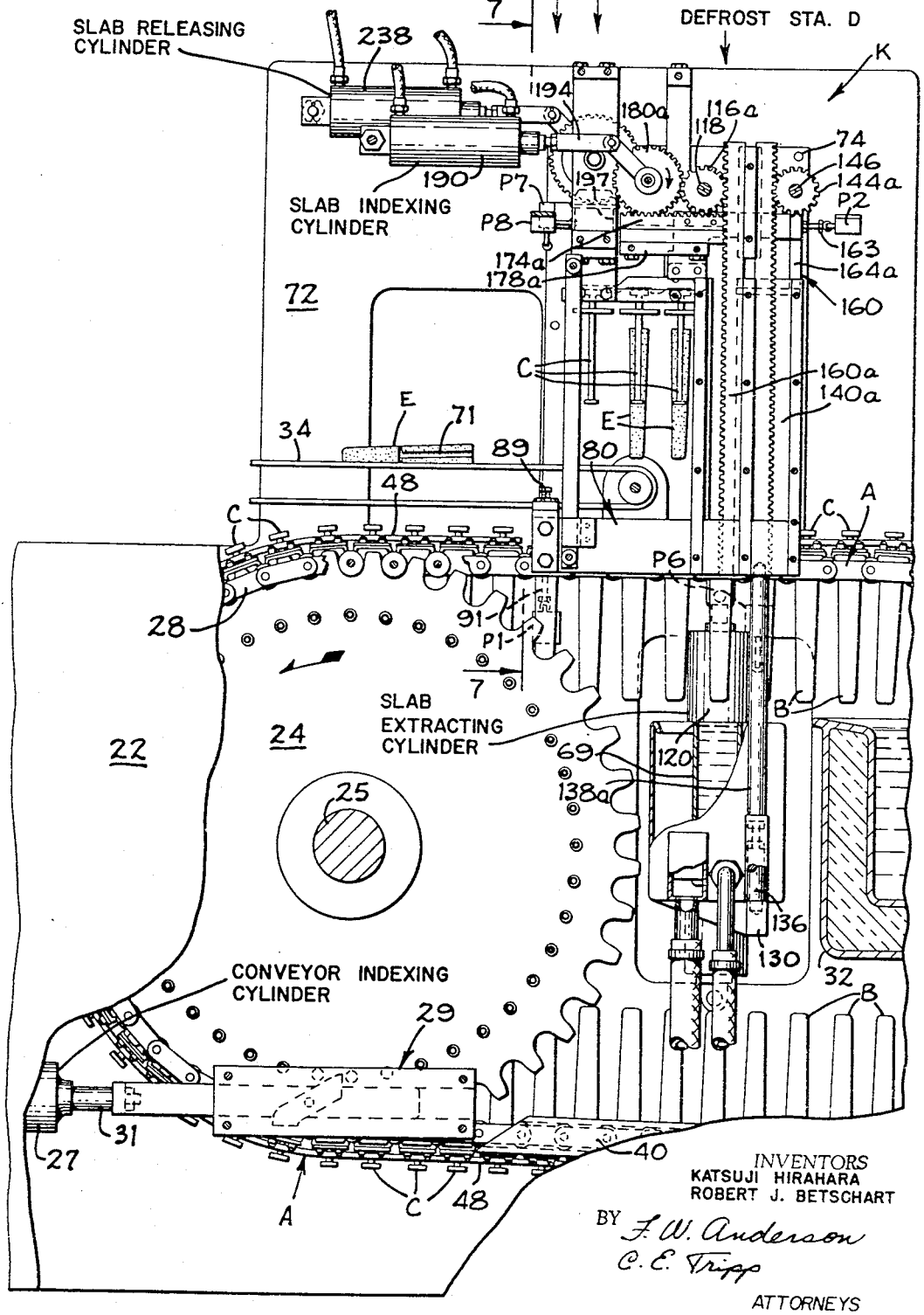

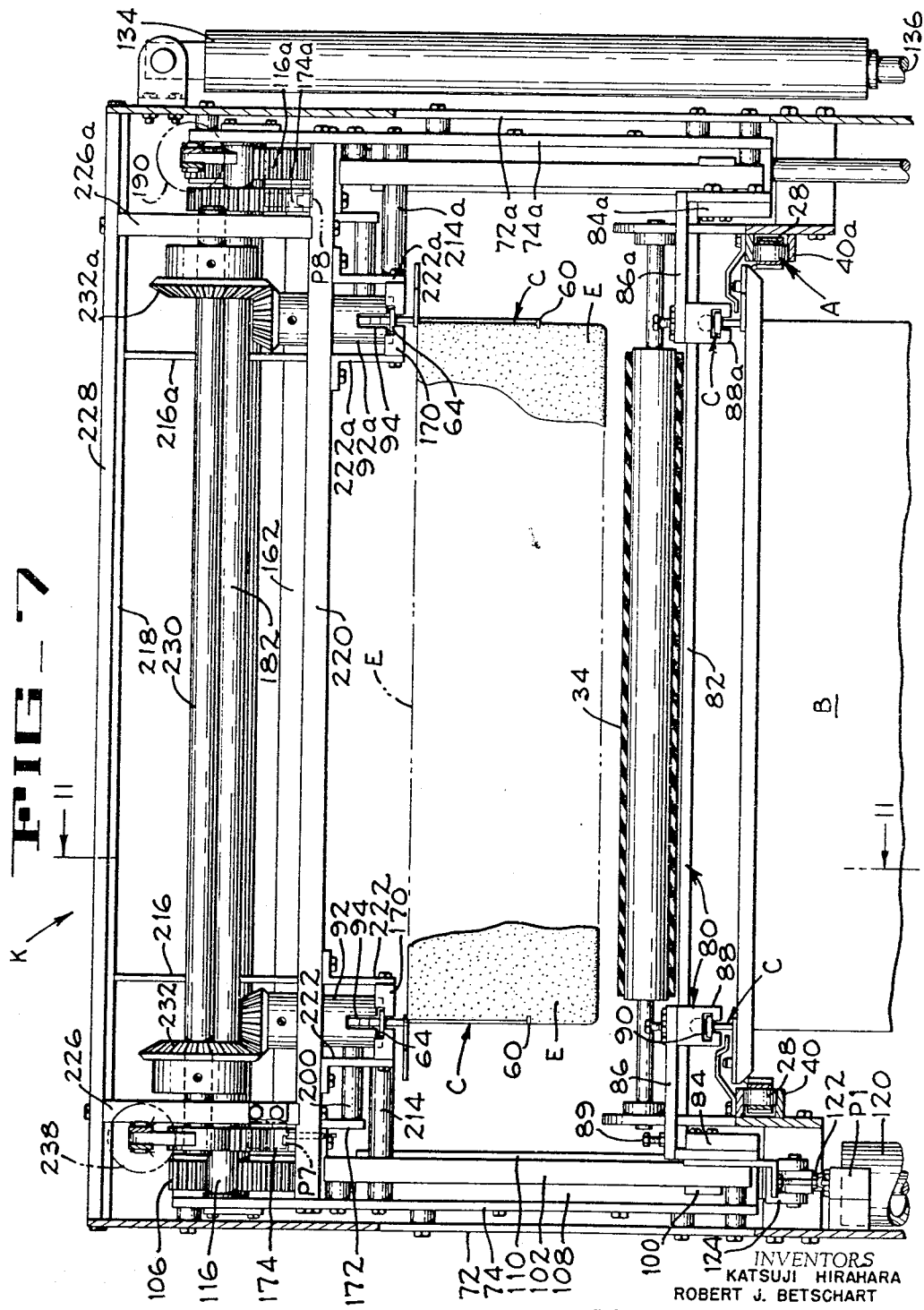

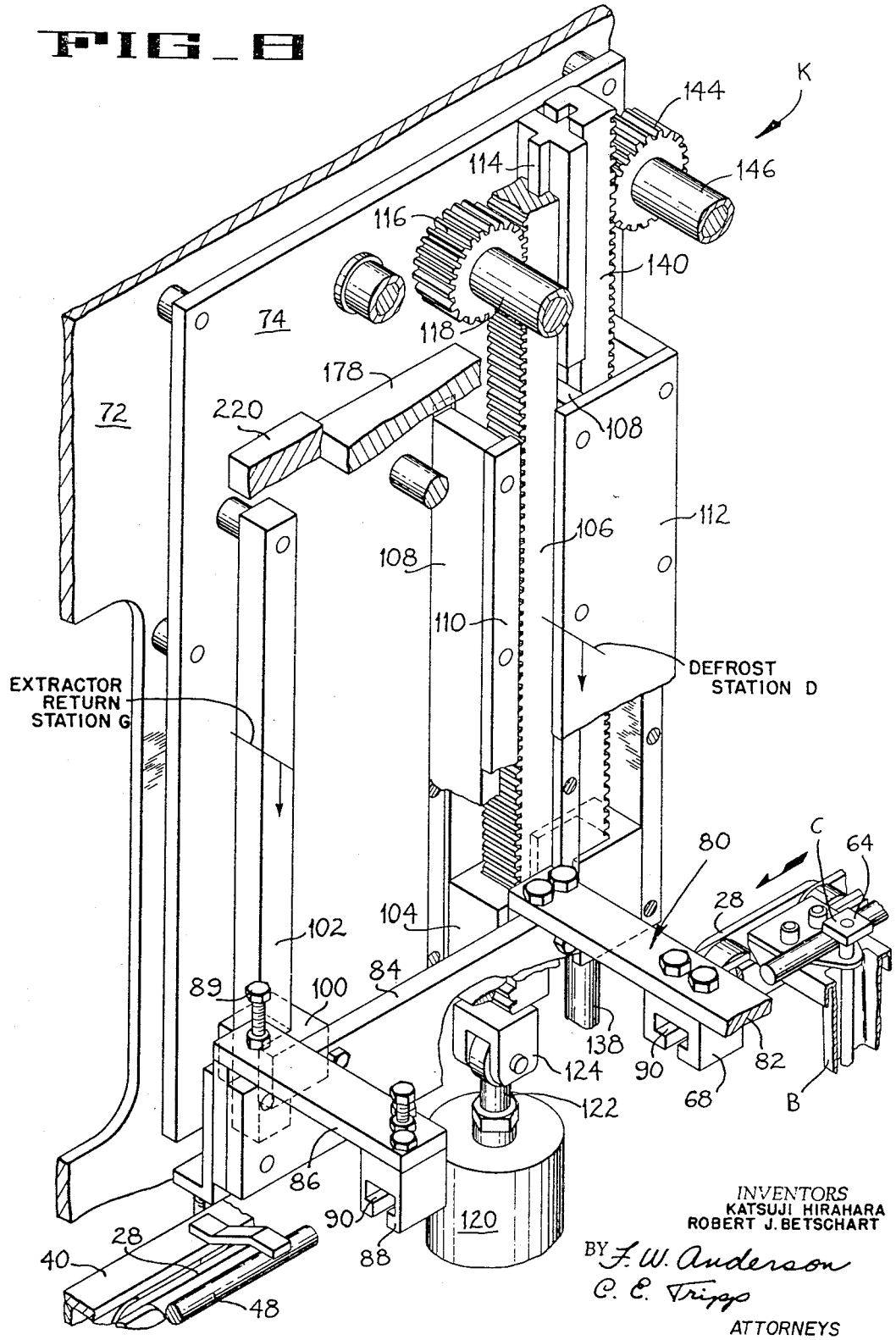

Jan. 13, 1970  KATSUJI HIRAHARA ET AL  3,488,976
FROZEN PRODUCT MACHINE
Filed May 6, 1968  14 Sheets-Sheet 6
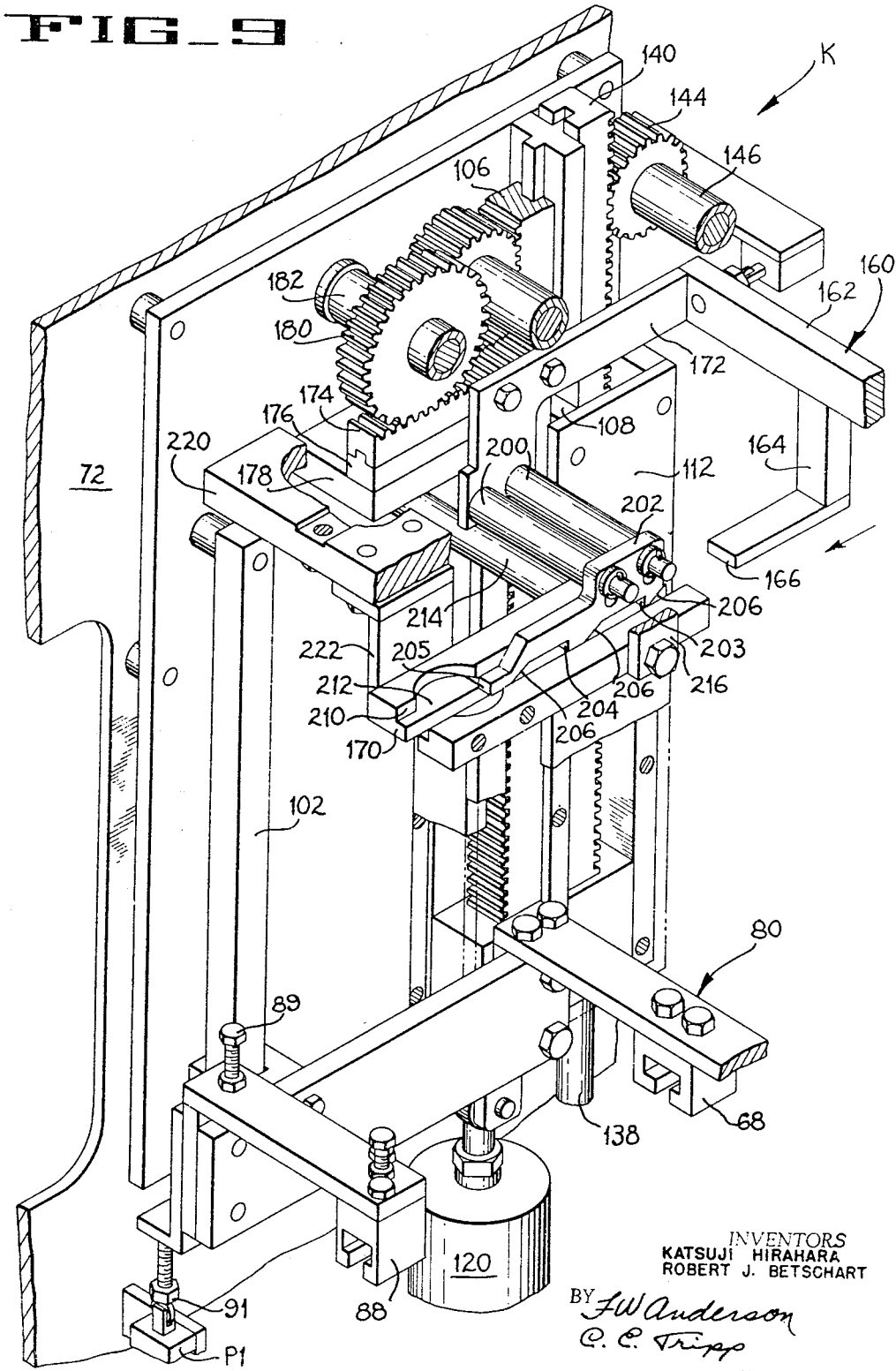
INVENTORS
KATSUJI HIRAHARA
ROBERT J. BETSCHART
BY F W Anderson
C. C. Tripp
ATTORNEYS

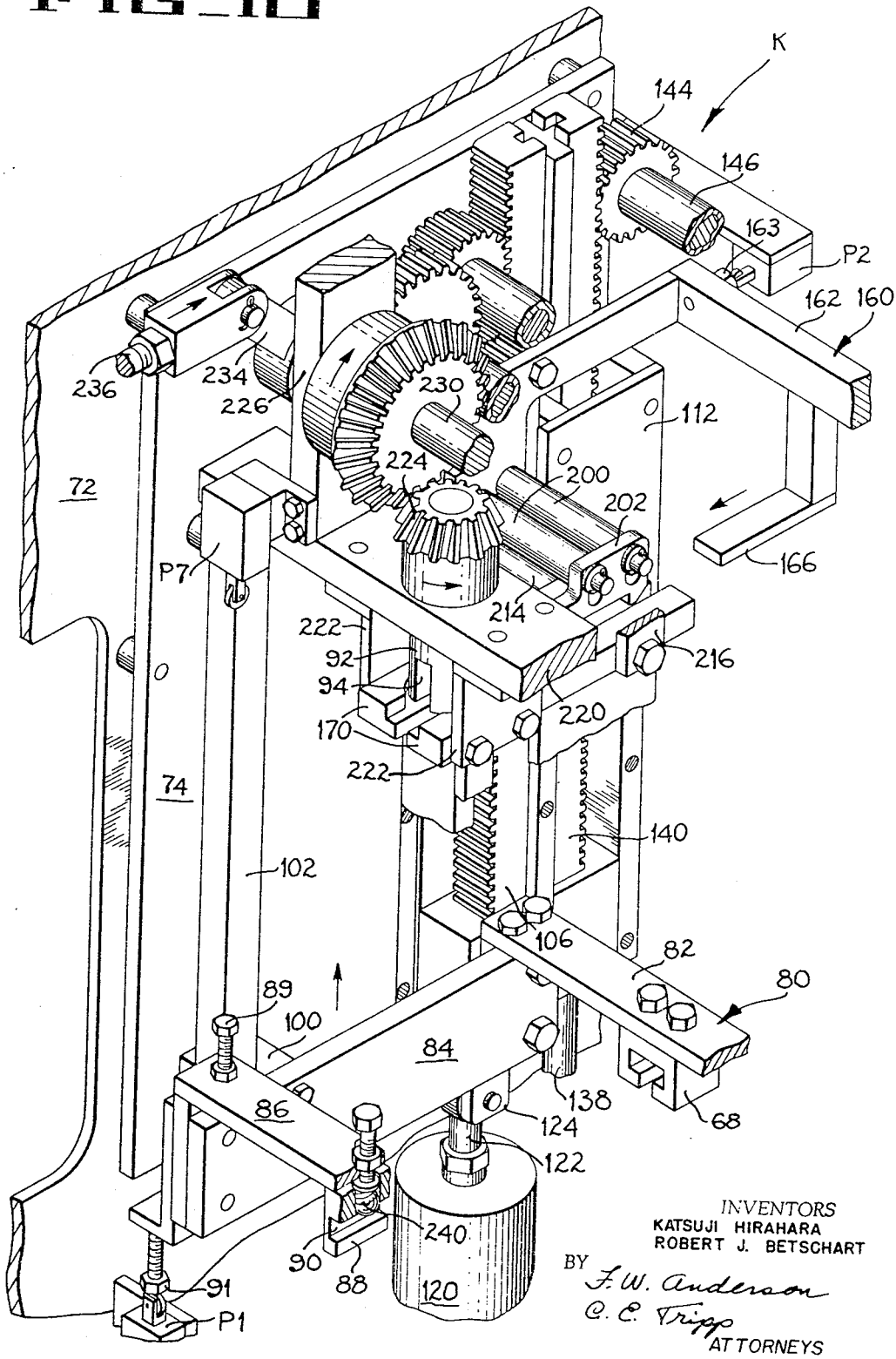

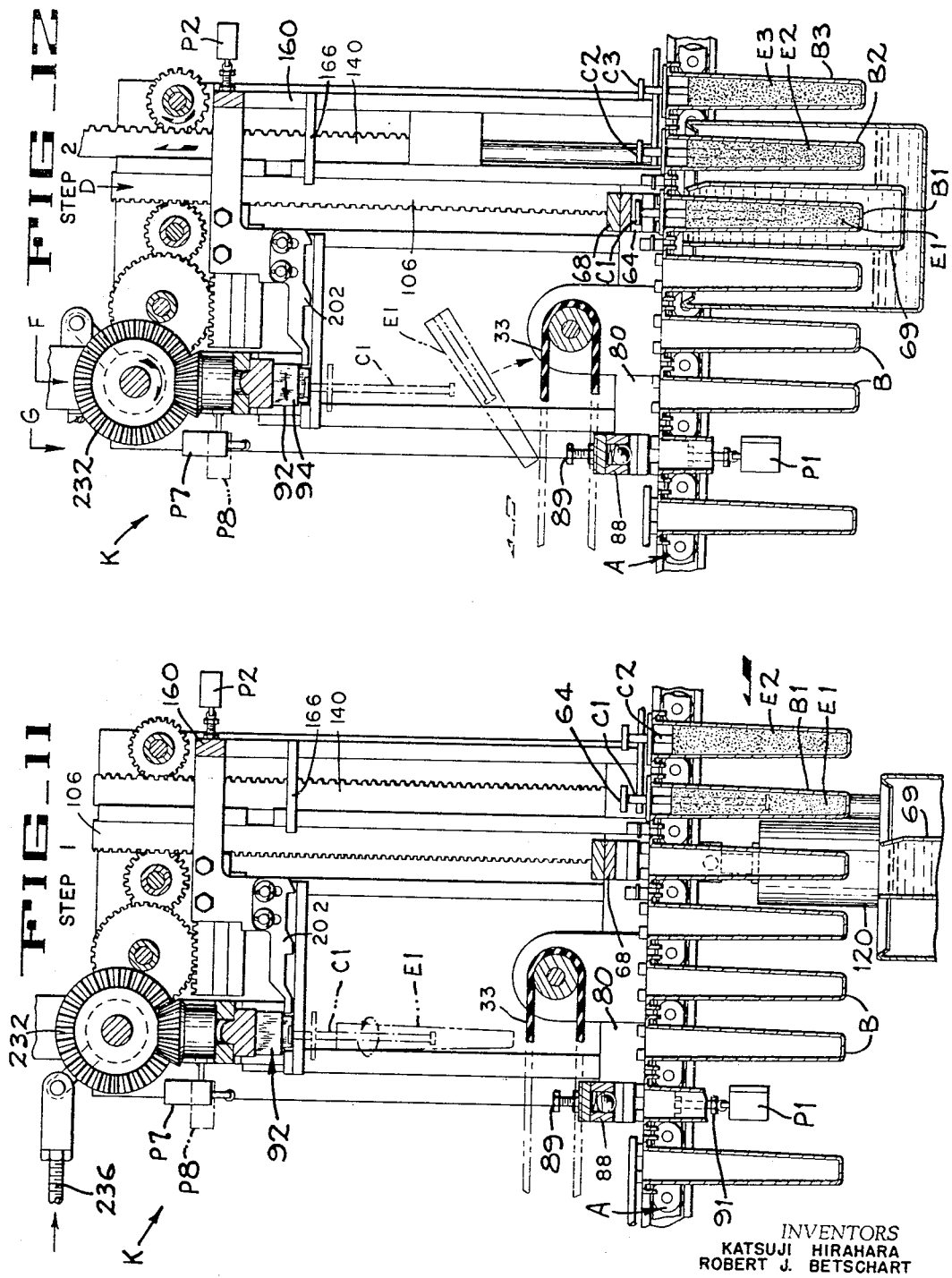

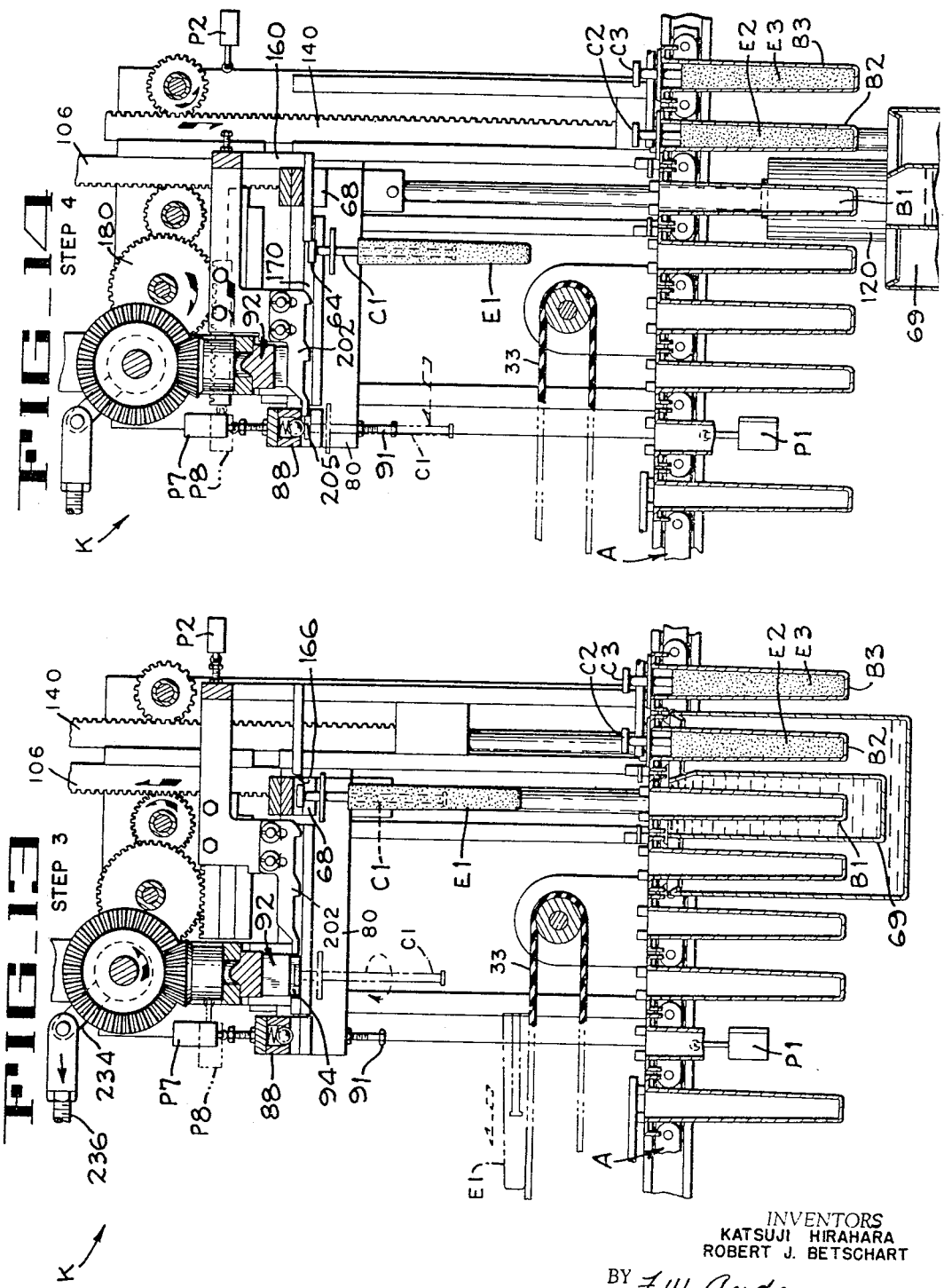

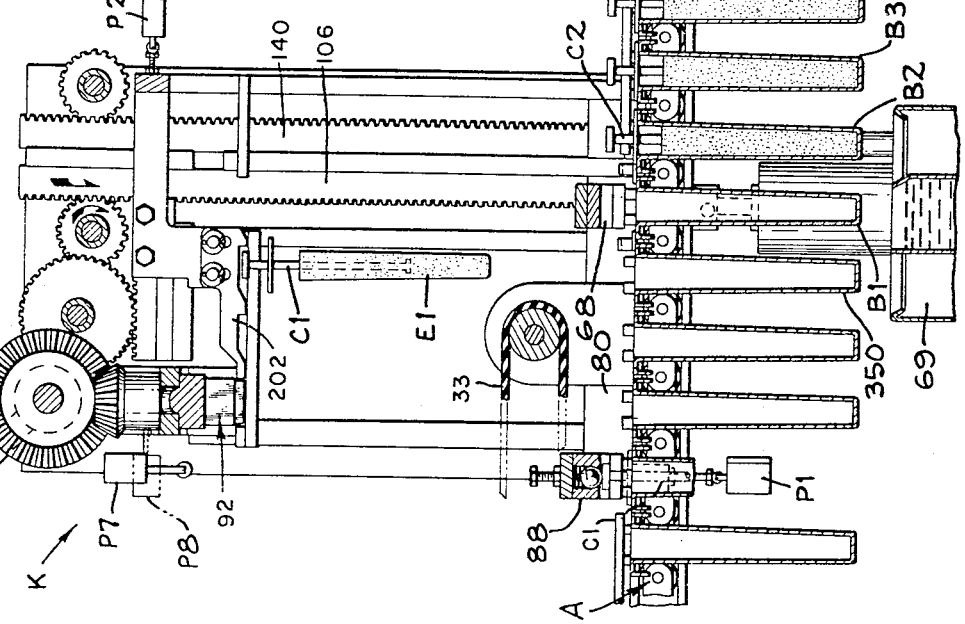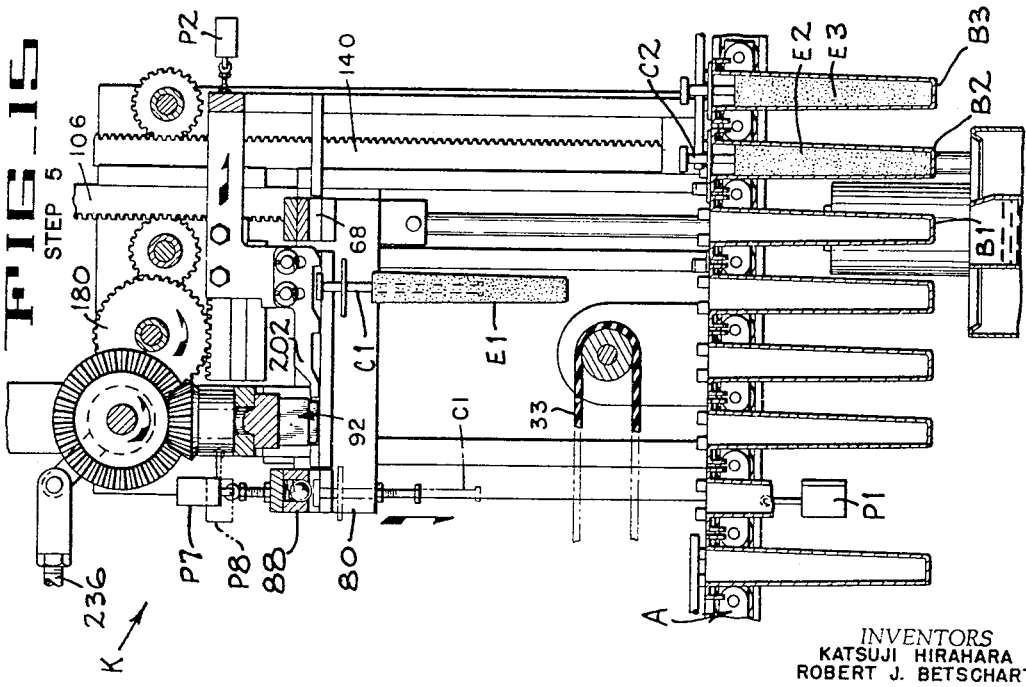

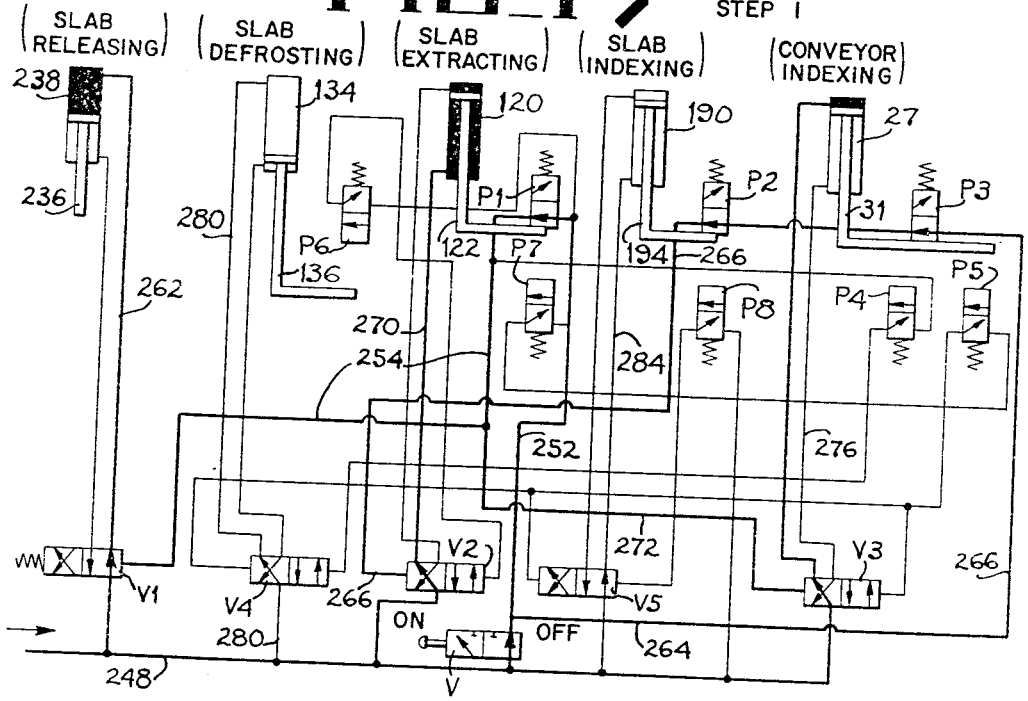
FIG_17 STEP 1
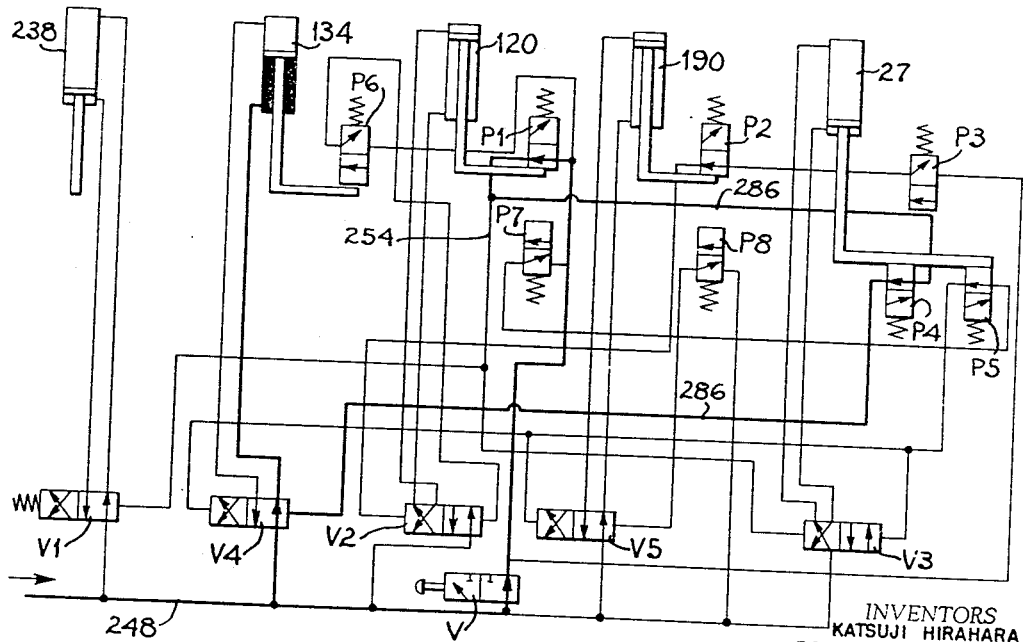
FIG_18 STEP 2

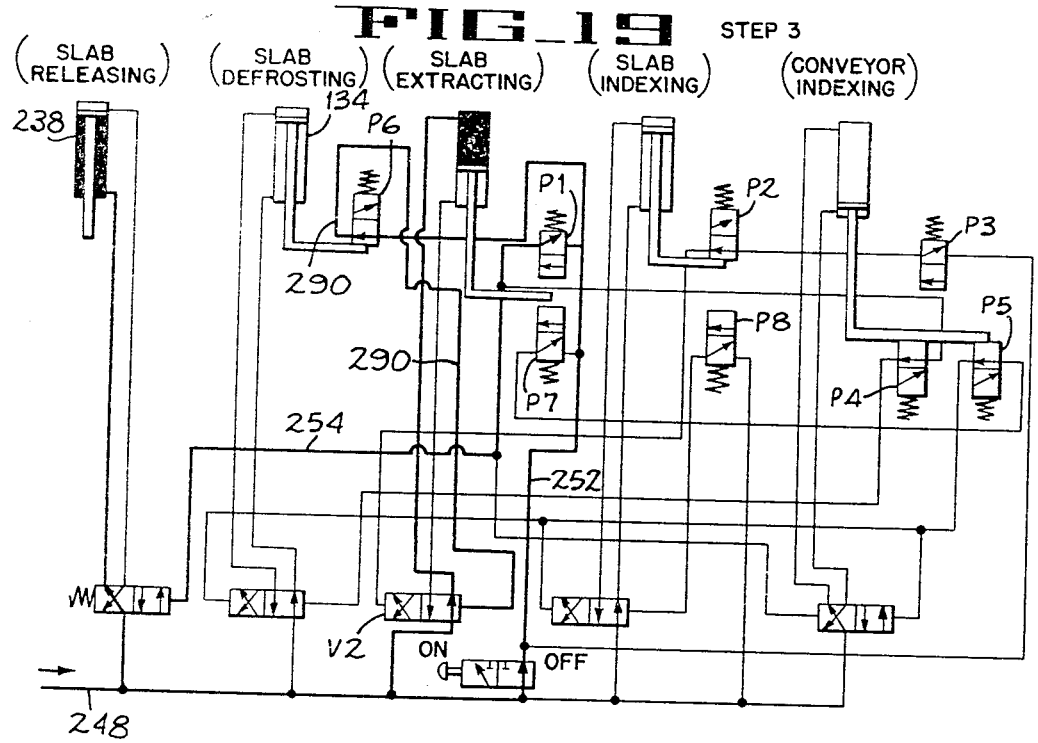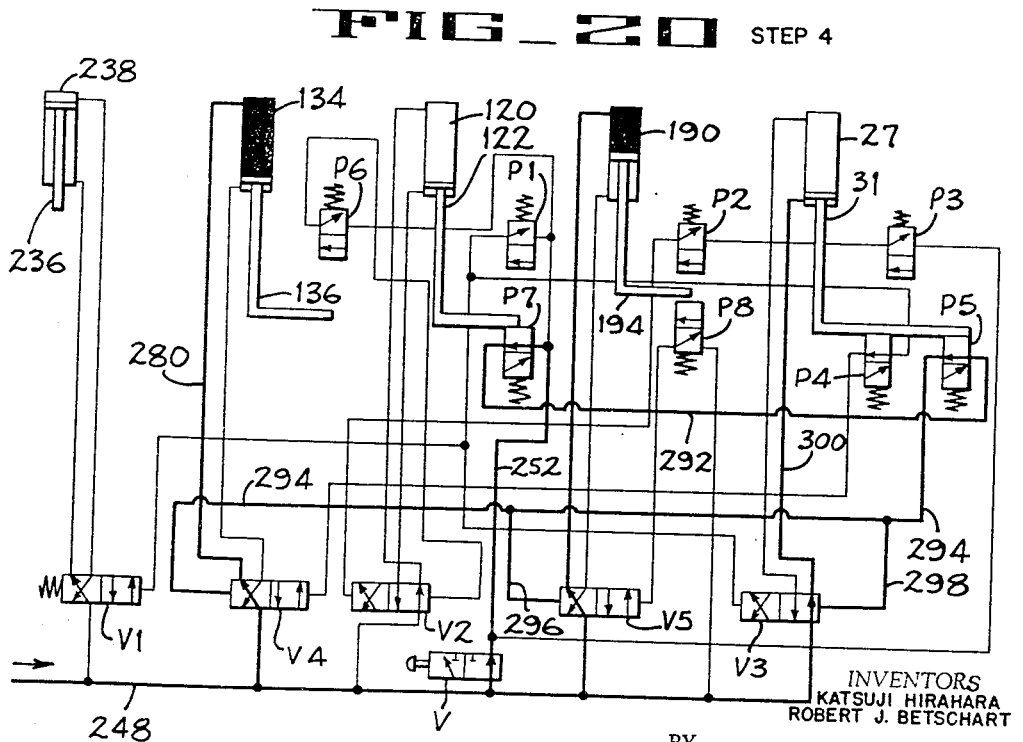

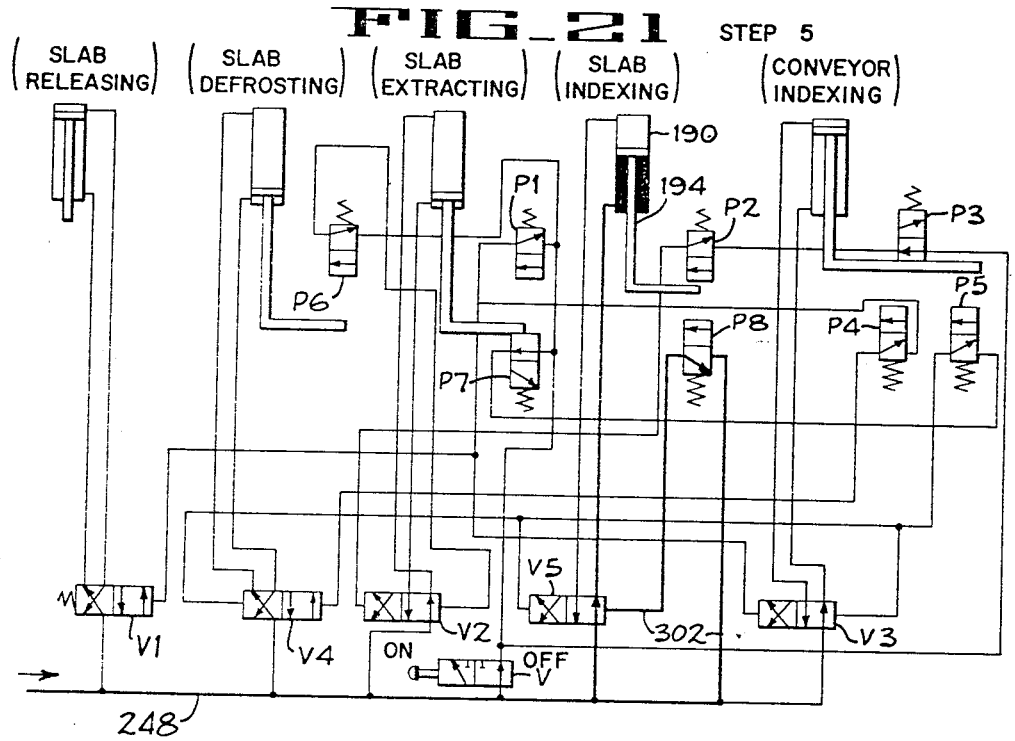
FIG_21 STEP 5
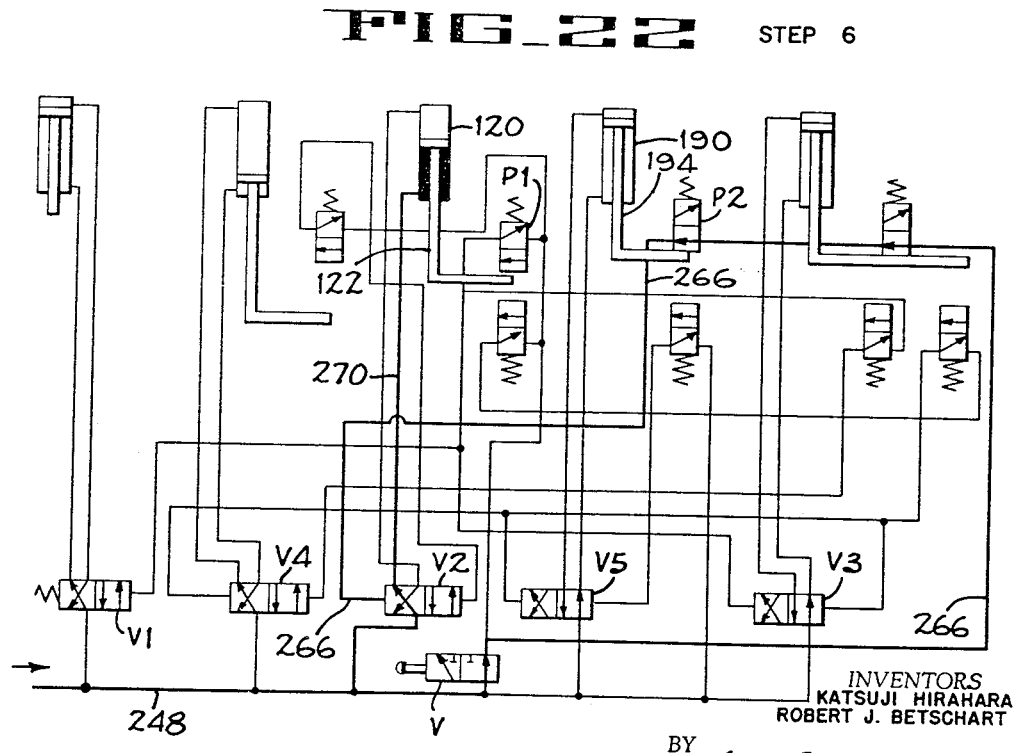
FIG_22 STEP 6
INVENTORS
KATSUJI HIRAHARA
ROBERT J. BETSCHART
BY
F. W. Anderson
C. E. Tripp
ATTORNEYS Jan. 13, 1970  KATSUJI HIRAHARA ET AL  3,488,976
FROZEN PRODUCT MACHINE
Filed May 6, 1968  14 Sheets-Sheet 14
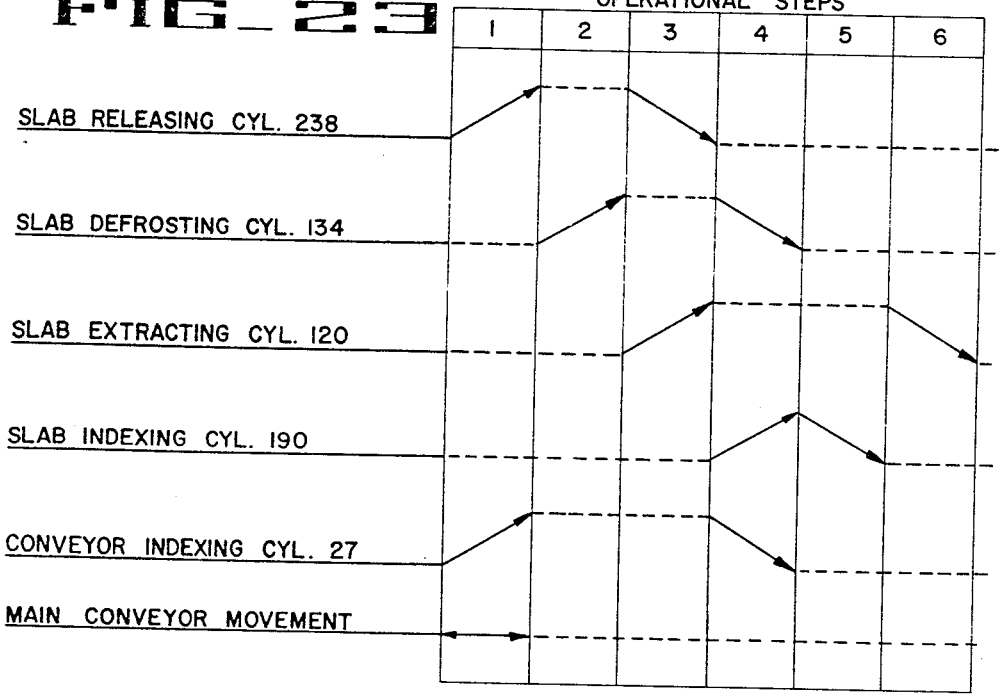
FIG_23
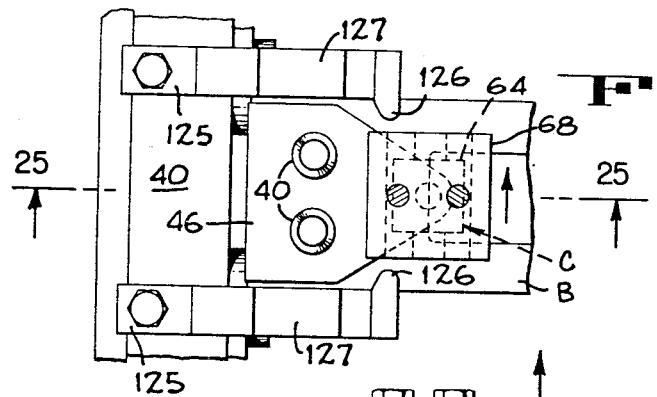
FIG_24
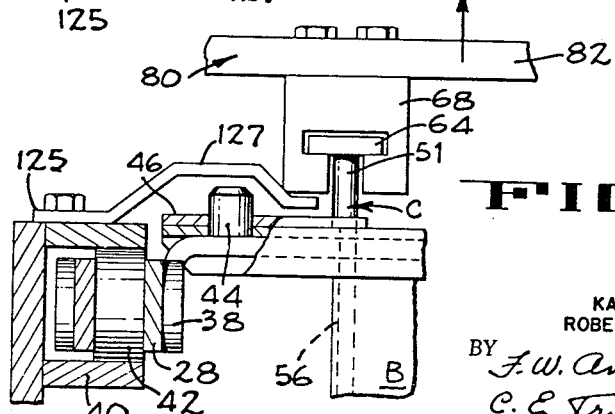
FIG_25
INVENTORS
KATSUJI HIRAHARA
ROBERT J. BETSCHART
BY F. W. Anderson
C. E. Tripp
ATTORNEYS

United States Patent Office 3,488,976
Patented Jan. 13, 1970

3,488,976
FROZEN PRODUCT MACHINE
Katsuji Hirahara, San Jose, and Robert J. Betschart, Sacramento, Calif., assignors to FMC Corporation, San Jose, Calif., a corporation of Delaware
Filed May 6, 1968, Ser. No. 726,906
Int. Cl. F25c 7/04
U.S. Cl. 62—303                         16 Claims

ABSTRACT OF THE DISCLOSURE

An endless series of molds and an associated extractor for each mold automatically and continuously move through a filling zone, a brine tank, and an extraction zone where the frozen product slab is removed on the extractor and separated from the frozen slab. The extractor is mechanically reinserted in a mold, and the molds and extractors are inverted, washed and sterilized during return to the filling zone. The slab is contacted only by two sterile support pins of the extractor, and the sterile mold.

BACKGROUND OF THE INVENTION

Field of the invetnion

The present invention concerns continuous product freezing machines, and more particularly to an automatic machine for the continuous production of frozen slabs of liquid or semi-liquid food products, such as egg whites, egg yolks, or mixtures thereof, ice cream, etc.

DESCRIPTION OF THE PRIOR ART

The Lampman patent 3,335,579 and the pending patent application of Hirahara et al., Ser. No. 601,926, now Patent No. 3,403,639, issued Oct. 1, 1968, both having the same assignee as the present invention, disclose continuous freezing machines of the type to which the machine of the present invention relates. Neither machine is suitable for the freezing of shelled, fresh eggs, primarily because the various parts which contact the product are not readily maintained in a sterile condition. This presents a problem with products such as eggs, which often promote and are subject to bacterial growths.

The Hirahara et al. machine has slab breakers which strike each frozen slab after it has been withdrawn from the mold, to release the slabs from the extractors. These breakers cannot conveniently be rendered sterile between operating cycles.

The Lampman machine has extractor bars with rotatable pins which release the slabs from the molds, and the product-free bars are collected separately on a conveyor to be reinserted into the molds by hand. Thus, sterilization of the extractor bars presents a problem in Lampman. As mentioned, although Hirahara et al. solve the problem of sterilizing the extractors in the machine by reinserting them in the molds, the product must be released by non-sterilized breakers.

It is also significant that in the Hirahara disclosure the slab extractors are removed from the molds and reinserted in the molds at the same station, and the actual slab discharge must be such that the frozen products are swung downstream of that station in order to clear the extractor bars (which extend entirely across the mold conveyor) for extraction and reinsertion. Thus even if rotatable release pins were fitted to the extractor bars of Hirahara et al. (as in Lampman) to facilitate sterilization, there could be no means under the bars for collecting the released product which would not also interfere with reinsertion of the bars and their pins into the molds. In other words, the Lampman construction prevents the mounting of a discharge conveyor at the same station at which the extractors are returned to the molds, and at any station upstream thereof. Thus the concepts embodied in the Hirahara et al. and Lampman machines are essentially incompatible, and for the present purpose neither machine can function, or can be conveniently altered to function, under the stringent sterile conditions required for the production of frozen slabs of fresh egg mixtures.

For reasons which include the drawbacks of prior art frozen product machines as set forth above, the present practice for processing plants which supply frozen eggs and the like to manufactures of food products is to freeze the eggs in five gallon tins. The filled tins are covered with lids, stacked on pallets, spaced apart for air circulation, and are then placed in a cold room where freezing may total 18 hours at −25 degrees F., to 72 hours at −5 degrees F. After freezing, the cans are restacked and stored at 0 degrees F. The tins of frozen eggs, after delivery to the user, require defrosting for about 24 hours in a cool room at about 40 degrees F. Due to the relatively long freezing and melting times required, the method above outlined presents more opportunity for bacterial spoilage than does a quick-freeze and rapid melt. The freezing machine of the present invention requires about 18–20 minutes for freezing and about 6–11 minutes for melting the same 30 pound quantity now requiring a total time of 42 hours or more.

SUMMARY OF THE INVENTION

The present invention quick-freezes eggs into slabs with apparatus which requires no external slab breakers or the like, and which extractors are reinserted into the molds and sterilized with them.

The difficulties in obtaining these results inherent in Lampman and Hirahara et al. are overcome in the present invention by synchronously moving individual extractor pin carriers at each side of the mold, which carriers do not bridge the mold. Thus a discharge conveyor or chute can underlie the extractor pins and receive the products released by pin rotation. Now, the discharge conveyor can underlie the frozen slab which bridges the carriers to receive the released slab, and without interfering with subsequent lowering of the carriers into the molds for subsequent washing and sterilization with the molds as they return to the mold-filling zone.

The other advantages and features of the invention include quick-freezing the slabs to inhibit bacterial growth, in contrast to present freezing cycles of 24 hours or more. The frozen slabs can be compactly stored in a cold room before use, and can be allowed to stand between extraction and storage as an interim, material handling convenience.

BRIEF DESCRIPTION OF THE DRAWINGS

FIGURE 1 is a side elevation, partly broken away, of the frozen product machine of the present invention.

FIGURES 2–5 are fragmentary schematic perspectives illustrating selected successive operational steps in the molding, thawing and removal of a frozen product slab.

FIGURE 6 is an enlarged fragmentary elevation of mechanism concealed by the herein broken away near side plate at the left portion of FIGURE 1.

FIGURE 7 is an enlarged transverse section taken along lines 7—7 on FIGURE 1.

FIGURES 8–10. FIGURE 8 is an enlarged fragmentary perspective of part of the mechanism at the left end of FIGURE 7; FIGURES 9 and 10 illustrate the same area covered by FIGURE 8 but in progressively more complete stages of assembly.

FIGURES 11–16 are diagrammatic longitudinal sections taken along lines 11—11 on FIGURE 7, and illustrate one complete cycle of six successive operational steps.

FIGURES 17–22 diagrammatically illustrate the pneumatic control circuit and the six sequential steps that respectively correspond to the steps illustrated in FIGURES 11–16.

FIGURE 23 is a timing diagram, the vertical divisions of which correspond to the six operational steps shown in FIGURES 11–22.

FIGURE 24 is an enlarged fragmentary plan of a mechanism which prevents upward movement of a mold while the frozen product slab in the mold is extraced.

FIGURE 25 is a section taken along lines 25—25 on FIGURE 24.

DESCRIPTION OF THE PREFERRED EMBODIMENT

The frozen product machine 20 (FIG. 1) embodies some of the same general machine components disclosed in the previously mentioned patent of Hirahara et al., and in the Rasmusson Patent 3,031,978. Freezing machines of this type operate by intermittently conveying a plurality of molds successively through stations at which a filling mechanism places product in the molds, a freezing tank freezes the product in the molds, defrosting means thaw the exterior of the frozen product to the extent that it can be removed from the mold, and washing and sterilizing apparatus prepare the molds for another filling cycle.

Briefly, and with reference to FIGURE 1, the frozen product machine 20 includes a frame 22 which supports a pair of intermittently driven drive sprockets 24 and a pair of idler sprockets 26, only one of each being shown. The drive sprockets are mounted on a common shaft 25 and one of the sprockets is driven by an air cylinder 27 having a piston rod 31 that reciprocates a ratchet mechanism 29 in the same manner disclosed in the Hirahara et al. application. An endless conveyor chain 28 extends longitudinally through the machine around each aligned pair of sprockets to form a mold conveyor A, and laterally extending open-top molds B are secured to and carried by the chains. For controlling automatic operation of the conveyor A and associated apparatus in a manner later described, a rearward extension of the piston rod 31 carries a valve actuator bar 33 which in one position actuates two pilot valves P4 and P5, and in another position actuates a pilot valve P3.

The upper reach of the chain extends under a mold filler 30 that automatically fills each mold with the product to be frozen, such as shelled fresh eggs, for example. Each mold carries an extractor mechanism comprising a pair of removable extractor pins C that are frozen into the product and support the frozen product slab E when it is removed from the mold. After filling, the molds proceed through an insulated brine tank 32 in which the liquid, at sub-freezing temperature, surrounds the molds and freezes the product both to the mold and to the extractor pins C carried within the mold.

Following intermittent movement across ascending portions of the upper chain reach, each mold comes to rest at a defrost station D where the frozen bond between the mold and the product is loosened. At this same station the extractor pins C are gripped and moved upward after the frozen bond is defrosted. The frozen product slab E is now in an elevated postion above the molds. In this elevated position, the slab is carried horizontally by the extractor pins C as the pins are driven in increments of movement synchronized with the movements of the mold conveyor A. At a discharge station F the extractor pins C are mechanically manipulated to release the slab E for removal from the machine by a discharge conveyor 33 and a chute at 34, and subsequent wrapping and packaging. The emply extractor pins C then advance to an EXTRACTOR RETURN STATION G where the extractors are lowered back into one of the molds on the conveyor A. During return toward the mold filler 30 on the lower reach of the mold conveyor A, the molds and the extractor pins therein are successively cleaned at a washing station H, rendered sterile at a sterilizing station J, and then move under the mold filler 30 to be refilled for another freezing cycle.

The present invention specifically concerns the extractor pins C and the mechanism associated with the defrost station D, discharge station F and the extractor return station G. Thus, the elements D, F and G collectively form a slab handling zone K which will be presently described in detail. First, however, it will facilitate an understanding of the basic structural details and inventive concept to briefly consider the selected operational procedures diagrammatically illustrated in FIGURES 2–5 for one of a pair of the extractor pins C.

The mold B (FIG. 2) carries an extractor pin C at each end, and includes an upper flange or ledge 36 which is supported by a chain attachment link 38 of the adjacent upper reach of the conveyor chain 28. Each chain reach is supported by fixed, linear track runs 40 which are engaged by integral rollers 42 of the chains 28. The attachment link 38 is provided with two upstanding studs 44 which project through corresponding apertures, not shown, in the ledge 36 so that the mold B is removably mounted on the conveyor chain 28 for replacement or repair. Also removably mounted in similar manner on the pair of studs 44 is an extractor support and locking plate 46. When the mold B is carried through the brine tank 32, and through other portions of the machine, except at the DEFROST STATION D and at the EXTRACTOR PIN RETURN STATION G, the extractor pin C and the mold B are prevented from upward movement by a fixed hold-down rod 48 that is closely spaced from the extractor support plate 46.

Secured to the extractor support plate 46 is an extractor pin C which has a round portion 51 with an axis of rotation 52 and a half-round shank 54 below the plate 46. The flat side 56 of the shank is coincident with the axis of rotation 52, and contacts the inner surface of the adjacent side wall 58 of the mold B. A semi-circular disc portion 60 is formed about the same axis 52 and has a larger radius than the half-round shank 54 so as to form an inwardly projecting ledge 62 that is eventually frozen to the product in the mold. The upper end of the extractor pin C is provided with a square gripping block or head 64 that is symmetrical about the axis 52.

The initially liquid product at 66 (FIG. 2) becomes frozen into the slab E (FIG. 3) as the mold progresses step by step through the brine tank 32 (FIG. 1). At the DEFROST STATION D, the gripping block 64 slides into a power-actuated transfer yoke 68 (FIG. 3), and while the mold B (FIG. 3) dwells, a defrosting tank 69 containing hot water is automatically elevated into surrounding relation with the mold to defrost the frozen bond between the slab E and the mold surfaces. The transfer yoke 68 is driven upward after a predetermined dwell of the defrosting tank in its up position to loosen the frozen bond between the frozen slab E and the mold B. A later described holding mechanism (illustrated in FIGURES 24 and 25) locks the mold B from vertical movement when the slab is extracted.

When the slab E and extractor pin 50 attain a predetermined elevation above the thus emptied mold, the gripping block 64 is moved downstream out of the transfer yoke 68. The frozen slab remains supported by the extractor pin C, as shown in FIGURE 4, because the extractor pin ledge 62 extends inwardly into the slab. After several increments of movement, the gripping block 64 slides into a twisting yoke, later shown and described, which is similar to the transfer yoke 68 but is arranged to be rotated 180 degrees about a vertical axis coincident with the axis 52 of the extractor pin C.

This rotation of the extractor thus causes the half-round shank 54 and the semi-circular disc 60 to lie wholly outside the end face 70 (FIG. 5) of the slab E, and the frozen slab drops by gravity from the extractor pin C for removal from the machine, wrapping, packaging and delivery or storage. The released slab has only a small cavity 71 which was formerly occupied by the disc and shank. The extractor is then rotated back to its initial position and transferred into a return yoke which is later described and shown. The return yoke moves the extractor pin vertically downward and replaces the extractor pin in one of the molds B. During return to the mold filler 30, the inverted molds and extractors are thoroughly washed, drained and sterilized before the molds are refilled for another freezing cycle.

It is important to note that even though the surfaces of the extractor pin C in the initial, unrotated position may be completely freed from the frozen slab E when the bond between the slab and the mold is defrosted, the slab cannot fall because the disc ledge 62 provides a positive supporting interlock with the slab. It is thus of no consequence that there may be no frozen bond between the extractor pin C and the slab E following the mold defrosting operation.

With more specific and detailed reference to the drawings, FIGURES 6 and 7 illustrate the overall slab handling zone K, and FIGURES 8, 9 and 10 illustrate structure which is associated with only one side of the machine, but is essentially the same as the structure at the other side of the machine. Similar parts at the other side of the machine also appear in various drawings with the same reference numerals and the suffix a. Extending upward from the machine frame 22 (FIGS. 6 and 7) at the sides of the slab handling zone K are side plates 72 and 72a which respectively carry machined mounting plates 74 and 74a. Vertically reciprocable between the two plates 74 and 74a is a transfer frame 80 which effects the vertical removal of the slab from the mold via the extractor pins C which carry the slab, and in conjunction with other mechanism, returns each pair of pins to one of the molds after the frozen product slab has been removed.

The transfer frame 80 includes a transverse extractor bar 82 which, adjacent each end, carries one of the transfer yokes 68, as shown for only one side of the machine in FIGURE 8. Extending forward from the ends of the bar 82 are plates 84 and 84a (FIGS. 7 and 8) carrying transverse stub bars 86 and 86a. The stub bar 86 carries a return yoke 88, as previously mentioned, at the EXTRACTOR RETURN STATION G (FIG. 6), and a bolt 89 which is arranged to actuate a pilot valve P7 when the transfer frame 80 is in its uppermost position. A bolt 91 on the underside of the transfer frame is arranged to actuate a pilot valve P1 when the transfer frame is in its lowermost position. A similar return yoke 88a is mounted on the stub bar 86a. The yokes 68 and 88 define longitudinally open and aligned generally T-shaped apertures 90 which are arranged to slidably receive the gripping head 64 of an extractor C. The yoke 88a and its unillustrated companion yoke (68a) are similarly apertured.

Intermediate the DEFROST STATION D, and the EXTRACTOR RETURN STATION G, the slab handling zone K (FIG. 10) includes the previously mentioned pair of twisting yokes 92 and 92a which are mounted at a fixed elevation at the DISCHARGE STATION F. The twisting yokes 92 and 92a define downwardly open vertical slots 94 and 94a in a cylindrical body 95, and are arranged so that solid body portions straddle the gripping heads 64 of a pair of extractors C when the twisting yokes are in the FIGURE 7 position. Subsequently, the twisting yokes 92 and 92a are rotated 180 degrees about a vertical axis to free the frozen slab, and then rotated back to their initial positions for transfer into the return yokes 88 and 88a when the transfer frame 80 elevates the return yokes.

Returning to FIGURE 8, plate 84 of the transfer frame 80 is provided with a forward guide block 100 which slidably engages a fixed, vertical guide bar 102. The other end of the plate 84 is provided with a similar guide block 104 which is anchored to the lower end portion of a gear rack 106 and slides in a vertical way which is defined by the mounting plate 74, a support bar 107, a guide bar 108, and cover plates 110 and 112. Above the guide bar 108, the upper portion of the rack 106 is guided and backed up by a slide plate having a land 114 which fits in a complementary groove in the rack to maintain meshing engagement of the rack with a pinion gear 116.

The pinion gear 116 is mounted on an equalizer shaft 118 having a similar gear 116a (FIG. 6) at the other side of the machine that is engaged with a similar rack 106a. A slab extracting air cylinder 120 (FIG. 8) has a piston rod 122 coupled to a clevis bracket 124 that is welded to the lower end of the rack 106. The interconnected racks 106, 106a and pinions 116, 116a assure simultaneous movement of each side of the transfer frame 80 when the slab extracting cylinder 120 is energized to vertically move the transfer frame 80. The holding mechanism previously mentioned, for allowing removal of the frozen slab and extractor pins while immobilizing the mold, is shown in FIGURES 24 and 25 for only one end portion of the mold. A pair of spaced holding straps 125 are bolted to the adjacent chain track and extend inward over the path of an incoming mold B. Confronting tab portions 126 of the straps 125 lie above the mold flanges 36 when the mold is indexed with the DEFROSTING STATION D, and the straps are vertically offset at 127 to clear the studs 44 when the mold is moved into defrosting position. Thus, when the transfer frame 80 is elevated to raise the transfer yoke 68, the mold B is held down by the holding straps 125, but the extractor pin C is not restrained.

The defrosting tank 69 (FIG. 6) is constructed and vertically reciprocated in the conventional manner disclosed in the aforementioned patents. Thus, the tank 69 is mounted on a cross bar 130 that extends through an aperture 132a (FIG. 1) in the side plate 72a at the left side of the machine. Mounted on the outside of the side plate 72a (FIG. 7) is a slab defrosting air cylinder 134, the depending piston rod 136 of which is secured to the cross bar 130 as shown in FIGURE 6. Connected to the same end of the cross bar is a shaft 138a which is aligned with, and connected to, a superposed rack 140a. A similar rack and shaft 140 and 138 (FIG. 8) are connected to the other end portion of the cross bar 130. One end of the cross bar 130 has a valve actuator 139 (FIG. 1) which, when the piston rod 136 is retracted to elevate the defrosting tank, actuates a pilot valve P6 that is a component of the later described control circuit.

The gear racks 140, 140a, and a pair of pinion gears 144, 144a which are interconnected by an equalizer shaft 146, assure coextensive movement of each end of the defrosting tank 69 when the slab defrosting cylinder 134 is energized. As shown in FIGURE 8, the cover plate 112, the adjacent surface of the guide bar 108, a support plate 148, and a guide block 150 mount the rack 140 in a manner similar to the mounting of the rack 106.

When the transfer frame 80 (FIGS. 7 and 9) elevates a pair of the extractors C to the position shown in FIGURE 7, a horizontally reciprocable pusher frame 160 is actuated to push the extractors C out of the transfer yokes 68. The extent of such movement is equal to the intermittent movement of the molds B on the conveyor A.

The pusher frame 160 includes a tie bar 162 which interconnects the FIGURE 9 structure with similar parts shown in FIGURES 6 and 7 at the other side of the machine. The tie bar 162 carries a valve actuator bolt 163 (FIGS. 6 and 10) that is arranged to actuate an air valve P2 when the pusher frame 160 is in its fully retracted position. Depending from the tie bar 162 (FIGS. 6 and 9) are L-shaped brackets 164 and 164a. The bracket 164 has a longitudinally extending pusher bar 166 that is aligned with the aperture 90 in the transfer yoke 68 when the yoke is elevated by the transfer frame 80. The bracket 164a has a similar pusher bar, not shown, cooperating with the other transfer yoke.

When the pusher frame 160 moves downstream with the pusher bars aligned with the yokes, the extractor pins are moved out of the yokes by the pusher bars of brackets 164 and 164a, and onto associated two-piece elevated guide tracks 170 and 170a (FIGS. 7 and 9) that will be presently described.

The tie bar 162 (FIG. 9) is connected to an arm 172 which is bolted to a rack 174. Rack 174 has a grooved undersurface and is slidable on a complementary guide rib 176 that is supported and secured to a fixed shelf 178 which projects from the mounting plate 74. Rack 174 is meshed with a pinion gear 180 that is fixed on a rotatable equalizer shaft 182. The pinion gear 180a (FIGS. 6 and 7) at the other side of the machine is mounted near a slab indexing air cylinder 190 which is pivoted to the side plate 72a. The pinston rod 194 of the slab indexing cylinder is coupled by a link 196 to the equalizer shaft 182. When the cylinder 190 is energized to project its piston rod from the position shown in FIGURE 6, the pinion gears 180 and 180a rotate clockwise and drive the pusher frame 160 downstream a distance equal to the indexing movement of the molds B. As shown in FIGURES 6 and 7, the rack 174a has a projecting bolt 197 which is arranged to actuate a pilot valve P8 when the pusher frame 160 is in its downstream position.

The pusher frame 160 (FIG. 9) includes a pair of inwardly projecting shafts 200 secured to the arm 172 and having reduced-diameter end portions 201. The end portions extend loosely through vertically elongate slots in an upwardly displaceable gravity-return pawl 202 which functions to advance and lock the extractor pins each time the pusher frame 160 is moved downstream. Thus, the pawl 202 is provided with driving ledges 203, 204 and 205 that are arranged to engage and push the gripping head 64 of an extractor pin, and which are spaced from one another a distance equal to the stroke of the pusher frame 160 and to the spacing between the molds B. An inclined camming surface 206 adjacent each driving ledge cams the pawl 202 upward when it is returned over the extractor pin gripping head 64 to its FIGURE 9 position after a driving stroke. Meanwhile, the extractor pin gripping head is supported by the guide track 170. The two stations intermediate station D and station F are necessary for space requirements and correspond to the positions in which the driving ledges 203 and 204 place an extractor pin.

The guide track 170 is formed of two separate members 208 and 209 which have confronting edges spaced apart to cooperatively define a slot which permits free sliding movement of the shank of the extractor pin but prevents lateral tilting of the pin. Further, the confronting edges of members 208 and 209 are relieved so as to form coplanar horizontal support surfaces, and vertical, parallel guide surfaces at 210 to support and guide the gripping head of the extractor pin. Near the end of the thus formed guideway, the tracks 170 are provided with confronting arcuate recesses which cooperatively define the diametrically opposite parts of a circular recess that provides a clearance aperture 212 for receiving the cylindrical body 95 (FIGS. 7 and 10) of the twisting yoke 92.

Means for supporting the upstream ends of the tracks 170 (FIG. 9) include a horizontal shaft 214 that projects from the mounting plate 74 and is connected to the near track. The other track is suspended by a link 216 from an overhead tie beam 218 (FIG. 7) that interconnects the side plates 72 and 72a. Support for the other ends of the tracks 170 includes a tie beam 220 extending between the mounting plates 74 and 74a, and angle brackets 222 which depend from the beam 220 and are bolted to the tracks.

Referring now to FIGURE 10, the twisting yoke 92 is rotatably mounted in axially fixed position in the tie beam 220, and is provided with a bevel gear 224. A bearing block 226, mounted between the tie beam 220 and a similar tie beam 228 (FIG. 7), rotatably mounts a transverse equalizer shaft 230 having a bevel gear 232 meshed with the gear 224. A link and collar 234 are secured to the adjacent end portion of the shaft 230 and coupled to the piston rod 236 of a slab releasing cylinder 238 (FIG. 6). When the cylinder 238 is energized to project its piston rod, the gear train rotates the twisting yoke 92 counterclockwise 180 degrees, and the shaft 230 and bevel gears 224a and 232a (FIG. 7) rotate the twisting yoke 92a 180 degrees in the opposite direction. This described movement causes the extractor pins C to free the frozen slab E in the manner previously mentioned, whereby the slab drops onto the takeaway conveyor 34.

At a point in the operating cycle when the transfer frame 80 (FIG. 9) is fully elevated, the return yoke 88 is horizontally aligned with the elevated tracks 170, the twisting yoke 92 (FIG. 10) is in the position illustrated, and the pusher frame 160 is in its downstream position. Accordingly, the driving ledge 205 on the pawl 202 has forced the extractor C, which was formerly held in the twisting yoke, downstream into the T-shaped aperture 90 of the return yoke 88.

When the transfer frame 80 is subsequently lowered to the position shown in FIGURES 8–10, the extractor pins C, as shown in FIGURE 7, are replaced in one of the molds B. Because the slab E has been released from the extractor pins C before the extractor pins are moved into the return yokes 88 and 88a (FIG. 7), it is necessary to mechanically stabilize the pins so as to inhibit their tendency to tip due to their unbalance, and thereby assure that the pins are accurately aligned for return to the mold. Accordingly, the return yoke 88 (FIG. 10) is provided with a spring-urged ball detent 240 which bears downward on the gripping head 64 of an extractor pin to keep the extractor pin vertical and inhibit relative movement between the head 64 and the yoke 88 until the extractor pin has been returned to the mold.

The extractor pins are moved toward the mold in their initial positions in which they were moved into the slab handling zone K, and are positioned as illustrated in FIGURE 2 after being returned to the mold. Thus, the extractor support plate 42 is positioned on the studs 44 so that the next indexing movement of the mold conveyor chains 28 will carry the gripping heads 64 of the extractor pins out of the return yokes 88 and 88a.

FIGURES 11–16 diagrammatically illustrate successive operational steps of the mechanism associated with the slab handling zone K, and FIGURES 17–22 schematically illustrate sequential stages of operation of an automatic control circuit incorporating the pilot valves P1–P8 which govern the various air cylinders that power the machine. The ensuing description covers both the control circuit and the mechanism thereby controlled as the molds and frozen product slabs are automatically manipulated through the slab handling zone K, and are outlined as Steps 1–6 which correspond to the steps labeled on the vertical columns of the timing diagram, FIGURE 23.

It should here be noted that one complete operating cycle will include four indexing movements of the mold conveyor A. This will result in one pair of the extractor pins being moved from one mold B on the mold conveyor A, through the slab handling zone K, and returned to another mold B on the mold conveyor A. Each indexing movement of the mold conveyor corresponds to the six steps illustrated in FIGURES 11–16. To avoid duplication of figures showing intermediate steps which are conveying movements necessitated by timing considerations, an extractor pin C1 is illustrated in full lines through only part of a complete operating cycle, and its subsequent movements, minus the intermediate steps, are illustrated by a phantom line extractor pin C1. Except where later noted, the ensuing description concerns the full line extractor C1.

STEP 1 (FIGURES 11 and 17)

The frozen product machine 20 is placed in operation by supplying air under pressure to an air input conduit 248, and by pulling the actuator of an ON-OFF air valve V. Assuming that the machine has previously been operated, as in the production run of a previous day, the positions of the various air cylinders might be as follows: the slab releasing cylinder 238 is at the end of a dwell period with its piston rod 236 retracted; the slab defrosting cylinder 134 is at dwell with its piston rod 136 advanced; the slab extracting cylinder 120 is at the beginning of a dwell period with its piston rod 122 retracted; the slab-indexing cylinder 190 is at dwell with its piston rod 194 retracted; and the conveyor indexing cylinder 27 is at the end of a dwell period with its piston rod 31 retracted. Correspondingly, the twisting yoke 92 will next begin to rotate; the defrosting tank 69 is at its lowermost position; the transfer frame 80 is in its lowermost position; the pusher frame 160 is in its upstream position; and the main conveyor A will next be indexed by the conveyor indexing cylinder 27.

When the valve V is "ON," a straight passage in the valve is aligned with a conduit 252 that is connected to the pilot valve P1 for the slab extracting cylinder 120. Because the piston rod 122 of the cylinder 120 is retracted, the straight passage in the valve P1 is in communication with a conduit 254. The air thus supplied to an air-operated, spring-return slave valve V1 shifts the core of the valve to place a straight passage in communication with the air input line 248 and a conduit 262 which leads to the slab releasing cylinder 238. The piston rod 236 is thereby projected, and the twisting yoke 92 (FIG. 11) begins to rotate.

At the same time, the retracted piston rods 194 and 31 of the slab indexing cylinder 190 and the conveyor indexing cylinder 27 have mechanically positioned the straight passages in their respective pilot valves P2 and P3 to transmit air through a conduit 266 to an air-operated slave valve V2. A diagonal passage of the valve V2 thus transmits air through a conduit 270 into the piston rod end of the slab extracting cylinder 120 to assure that the transfer frame 80 is completely down before the main conveyor A is indexed by the conveyor indexing cylinder 27.

It will be noted that if the piston rod 122 of the slab extracting cylinder 120 is not fully retracted, the pilot valve P1 will not permit energization of the slab releasing cylinder 238 until the piston rod 122 of the slab extracting cylinder 120 is fully retracted to actuate the pilot valve P1. Similarly, the pilot valve must be actuated before air is fed from the conduit 254 into a conduit 272 that is connected to the conduit 254. The conduit 272 supplies pilot pressure to shift the core of an air-operated slave valve V3. As a safety measure, this assures that a diagonal passage of the slave valve V3 cannot admit air into a conduit 276 to project the piston rod 31 of the conveyor indexing cylinder 27 and index the main conveyor A, until the piston rod 122 of the slab extracting cylinder 120 is fully retracted.

As thus far described, the twisting yoke 92 (FIG. 11) begins to rotate, the transfer frame 80 is moved to its maximum down position (if not already down) so that the transfer yoke 68 can be slidably engaged by an extractor pin, and the conveyor A begins one indexing movement that will carry the molds B downstream a distance equal to the center to center spacing of the molds and place the gripping head 64 of the extractor pin C1 in the transfer yoke 68.

It will be seen that one diagonal passage of an air-operated slave valve V4 is interposed in a conduit 280 to transmit air from the input conduit 248 behind the piston of the slab defrosting cylinder 134 in order to maintain the defrosting tank 70 in its down position. Similarly, an air-operated slave valve V5, which is associated with the slab indexing cylinder 190, transmits air through a conduit 284 to retract the piston rod 194 of the slab indexing cylinder so that the pusher frame 160 is maintained in its rearward or upstream position.

STEP 2 (FIGURES 12 and 18)

When the conveyor indexing cylinder 27 has its piston rod 31 fully extended after completion of the above initiated driving stroke, the pilot valves P4 and P5 are actuated, and the first mold B1 with an extractor pin C1 is moved to the DEFROST STATION D so that the gripping head 64 of the extractor pin C1 slides into the transfer yoke 68 of the transfer frame 80. In actual operation, all of the molds carry extractor pins C, but as illustrated in FIGURES 11–16 the extractor pins downstream of the pin C1 have been omitted for clarity.

Pilot valve P4, thus actuated, transmits air from the conduit 254 through a conduit 286 to shift the core of the slave valve V4 and thereby raise the piston rod 136 of the slab defrosting cylinder 134. Since the defrosting tank 69 is coupled to the piston rod, the defrosting tank is elevated into surrounding relation with the mold B which is dwelling at the DEFROST STATION D.

With the assumed operational conditions previously outlined, the mold B1 (and the preceding molds B2, B3, etc. back to the filler 30) does not have any product since it has not yet been filled. In this case, the "empty" extractor pins C1, C2, C3 etc., will be moved through the slab handling mechanism K without any frozen product slabs E. Consequently, from this point on it will be assumed that the molds upstream of the DEFROST STATION D have already cycled through the machine and, therefore, the molds contain frozen product slabs E1, E2, E3, and so forth.

The frozen slab E1 (FIG. 12) is now being defrosted. It should be noted that the slab defrosting cylinder 134 cannot raise the defrosting tank 69 unless the slab extracting cylinder 120 has positioned the transfer frame 80 to its lowermost position to actuate the valve P7, and unless the piston rod 31 of the conveyor indexing cylinder 27 is at the end of a driving stroke to actuate the valves P4 and P5. As illustrated by the directional arrow on the twisting yoke 92 (FIGS. 11 and 12) the yoke has now been completely turned 180 degrees. When the extractor pin C1 has later moved into the twisting yoke as seen in phantom line in FIGURE 12, this rotational movement of the twisting yoke releases the slab E1 and the slab drops onto the conveyor 33.

STEP 3 (FIGURES 13 and 19)

When the defrosting tank 69 is in its uppermost position, the pilot valve P6 is actuated to raise the transfer frame 80 and extract the slab E1 from the mold B1. For this purpose, the pilot valve P6 reverses the air input to the slab extracting cylinder 120 by placing one of its valve passages in communication with the conduit 252 and a conduit 290, thus shifting the core of the slave valve V2 so that air is supplied to the piston end of the slab extracting cylinder 120; the projected piston rod of the cylinder 120 pushes the transfer frame 80 upward, and the thus elevated transfer yoke 68 carries the extractor pin C1 and the frozen slab E1 to the FIGURE 13 position in which the gripping head 64 of the extractor pin is horizontally aligned with the pusher bar 166 of the pusher frame 160.

As soon as the actuator of the pilot valve P1 is released when the piston rod 122 begins to move out of the slab extracting cylinder 120, the pilot valve P1 bleeds air from the conduit 254 to atmosphere so that the piston rod 236 of the slab releasing cylinder 238 returns to its retracted position. This causes the twisting yoke 92 to rotate 180 degrees so that the slot 94 is reversed. As seen in phantom, when the extractor pin C1 reaches the twisting yoke 92, the pin will be turned back to its original orientation.

STEP 4 (FIGURES 14 and 20)

In this step, the pusher frame 160 is moved downstream so that the pusher bar 166 moves the gripping head 64 of the extractor pin C1 out of the transfer yoke 68 and onto the track 170. Also, the defrosting tank 69 is moved down, and the cylinder 27 which drives the main conveyor A is readied for another driving stroke. To this end, the slab extracting cylinder 120 actuates the pilot valve P7 at the end of its stroke, thereby conducting air into a conduit 292. The actuated pilot valve P5 transmits this air through a conduit 294 to shift the core of the slave valve V4 and pressurize the piston end of the slab defrosting cylinder 134 through the conduit 280. This lowers the defrosting tank 69.

Meanwhile, air from the conduit 294 is transmitted through a branch conduit 296 to shift the core of the slave valve V5. This causes the slab index cylinder 190 to be pressurized, and the pinion 180 is rotated clockwise to move the pusher frame 160 downstream a distance equal to the center to center spacing between the molds B. The gripping head 64 is thus moved downstream by the pusher bar 166. During the above outlined operational steps, a conduit 298 causes shifting of the core of the slave valve V3 so that air pressure is transmitted through a conduit 300 into the conveyor index cylinder 27. This retracts the piston rod 31 for a subsequent driving stroke which will place the mold B1 under its associated extractor C1.

It will be noted that the piston rod 31 of the main conveyor cylinder 27 must be fully projected to actuate the valve P5 before the above steps are effected. This assures that the main conveyor A has previously undergone a full-length indexing motion. If the machine had already operated through several cycles, the gripping head of an extractor pin would have been positioned ahead of the end pushing surface 205 of the pawl 202. Therefore, at the end of the operational step just described, this extractor pin would have been transferred into the twisting yoke 92. For the full line extractor pin C1, this transfer movement occurs after four complete operating cycles (or four indexing movements of the mold conveyor A) and is illustrated in FIGURE 11 by the phantom line extractor pin C1 and slab E1 in the twisting yoke 92.

STEP 5 (FIGURES 15 and 21)

In this step the pusher frame 160 is retracted upstream by the slab indexing cylinder 190 while all other mechanism is at dwell. At the end of the almost completed Step 4 driving stroke of the slab index cylinder 190 (FIG. 20), the pilot valve P8 is actuated. Valve P8 is connected in a conduit 302 that transmits air from the input line 248 to shift the valve core of the slave valve V5. This places a straight passage of the valve in alignment with the conduit 284 to pressurize the slab indexing cylinder 190 so as to rotate the pinion gear 180 and return the pusher frame 160 to its upstream position. The pawl 202 is cammed upward by the camming surface 206 engaging the gripping head 64 of the extractor pin C1 when the pusher frame 160 is retracted. As now positioned, the frozen slab E1 and its extractor pin C1 are one increment of conveying movement ahead of the mold B1 from which they were removed. After the next and final step, the sequence reverts back to Step 1 in which the main conveyor A is again indexed. After the mold conveyor A has indexed a total of four times, the extractor pin C1 will be returned to a different mold because the extractor pins and molds become out of phase after moving beyond the DEFROSTING STATION D.

STEP 6 (FIGURES 16 and 22)

In this step, the transfer frame 80 is lowered by the slab extracting cylinder 120 to its initial position. When the extractor pin C1 (phantom lines) is positioned in the return yoke 88 it is in the present step returned to the mold conveyor A. When pilot valve P2 is actuated at the completion of the retracting stroke of the piston rod 194, air from the inlet conduit 248 is conducted through the conduit 266 and the pilot valve P3 to shift the core of the slave valve V2. This feeds air from the inlet 248 to the conduit 270, thereby retracting the piston rod 122 of the slab extracting cylinder 120 and lowering the transfer frame 80 to its Step 1 position. With the piston rod 122 fully retracted, the control circuit is in a condition to begin another cycle of operation beginning with Step 1. The phantom line extractor pin C1 is thus reinserted in a mold B by the transfer frame 80. It is again noted that the extractor pin C1 is actually returned to one of the molds only at the end of three more of the six-step movements just described, and that the mold B1 will lag behind the pin C1 because the conveyor is not indexed until Step 1. Therefore, the full-line extractor pin C1 will be returned to the mold at 350 (FIG. 16), following which the conveyor indexes in Step 1 to place the extractor pin C2 into transfer yoke 68.

From the preceding description it will be evident that an important feature of the invention is the provision of a free extractor pin at each end of the mold, and means for conjointly manipulating the extractor pins without any mechanical connection between the pins. This makes possible the interception of the frozen slabs on a takeaway conveyor and the return of the extractor pins to a mold in the same general area of the machine, and with uncomplicated, easily maintained apparatus. Further, the extractor pins circulate with their associated molds through the washing and sterilizing zones of the machine preceding each filling and freezing of the mold contents, and are manipulated remotely of the slab to free the frozen bond between the pins and the slab. As a result, there is virtually no danger of bacterial contamination of the slabs with only the ordinary and usual sanitary precautions.

Although the best mode contemplated for carrying out the present invention has been herein shown and described, it will be apparent that modification and variation may be made without departing from what is regarded to be the subject matter of the invention as set forth in the appended claims.

We claim:
1. In a frozen product machine having a frame, an open top mold, conveyor means on said frame for incrementally carrying said mold through a plurality of processing stations, at least two rotatable extractor pins removably positioned in said mold, means for filling the mold with a product to be frozen into a slab on said extractor pins and subsequently withdrawn from the mold, the improvement wherein that portion of each of said extractor pins which lies within the mold includes a half-round shank having a flat longitudinal face and an oppositely disposed transversely arcuate longitudinal face, said flat face in an unrotated position of said extractor pin being in abutting relation with one inner wall of the mold so that said arcuate face is eventually freeze-bonded to the product slab and the flat face is substantially coplanar with the adjacent outer surface of the slab, and means for rotating said extractor pin substantially 180 degrees about an axis coincident with said flat face subsequent to freezing of the product slab and its removal from the mold, said rotation thereby reversing the former orientation of said extractor pin relative to the slab so that the frozen bond is destroyed and the extractor pin surfaces are laterally clear of the slab.

2. Apparatus according to claim 1 and a gripping head on the upper end of each of said extractor pins, a transfer yoke lying in the path of movement of said gripping head and arranged to slidably receive said gripping head, and power means for elevating said transfer yokes in order to remove the extractor pins and the frozen slab from the mold.

3. Apparatus according to claim 2 wherein said gripping heads each define parallel upright surfaces straddling the path of movement of said extractor pin, wherein said means for rotating said extractor pins includes a twisting yoke arranged to slidably receive the gripping head of each extractor pin, said yoke being provided with driving surfaces closely adjacent said parallel surfaces of said gripping head, and wherein power means rotate said twisting yokes substantially 180 degrees to thereby rotate said extractor pin and free the frozen product slab.

4. Apparatus according to claim 3 wherein said conveyor includes an endless chain at each end of said mold, an attachment link interconnecting said chain with the adjacent end of the mold, a locking plate secured to each of said extractor pins below said gripping head, and an upstanding lock stud secured to said attachment link, said locking plate defining an aperture arranged to circumscribe said lock stud when the extractor pin is seated within the mold.

5. Apparatus according to claim 1 and a semi-circular disc normal to the lower end of each of said extractor pin shanks, said disc having a flat edge coplanar with said flat face of said extractor pin, and having an arcuate edge with a larger radius of curvature than said arcuate face so that the curved portion of the disc projects inwardly beyond the arcuate face to provide a support ledge extending into the frozen product slab, said flat surface being coincident with the axis of rotation of said extractor pin and said arcuate surface being defined by a radius generated about said axis.

6. In a continuous freezing machine including a plurality of open top molds movable through a brine tank to freeze product in the molds, the improvement comprising an extractor pin removably positioned in each mold, said extractor pin including a gripping head positioned above the open top of the mold and a shank portion lying within the mold, a vertically reciprocable transfer yoke intermittently positioned in the initial plane of movement of said gripping head, said transfer yoke and said gripping head being arranged to slidably interlock at a defrosting station for subsequent coextensive vertical movement of said transfer yoke and said extractor pin, means operative to defrost the frozen bond between the frozen product slab and the mold at a defrosting station, means for moving said transfer yoke upward to a predetermined plane superposed above said defrosting station with the frozen product engaged with said extractor pin, a horizontally reciprocable pusher bar movable through driving and return strokes in the elevated plane of said gripping head, and power means for coextensively moving said pusher bar in a driving stroke in the same downstream direction with each powered movement of said conveyor, said extractor pin and the frozen product bar carried by said extractor pin thereby being ejected downstream from said yoke in vertically aligned and elevated relation with said molds, and support means for the thus ejected gripping head.

7. Apparatus according to claim 6 wherein said extractor pin shank is rotatable, said shank portion being half-round in cross section and provided with a flat side substantially coincident with an interior upright wall surface of the mold, and a semi-circular disc secured to said shank, said disc having a flat edge coplanar with the flat side of said shank and an arcuate edge formed with a radius larger than the radius of said shank and defining a ledge projecting inwardly of the mold beyond the half round surface of said shank.

8. Apparatus according to claim 6 and an upwardly displaceable gravity-return pawl movable with said pusher bar, said pawl having a surface defining an upright first driving ledge lying in the elevated plane of said gripping head and a forwardly declining camming surface in trailing relation with said ledge, said camming surface striking said ejected gripping head upon said return stroke of said pusher bar and upwardly displacing said pawl, said driving ledge thus being rearward of said gripping head at the termination of said return stroke for gravity return of said pawl to its initial position, said driving ledge thereby being positioned to advance said gripping head with the next downstream movement of said pusher bar while a second gripping head is ejected from said yoke by said pusher bar.

9. Apparatus according to claim 8 and means defining second and third driving ledges on said pawl, each of said ledges having an associated forwardly declining camming surface in trailing relation therewith, all of said driving ledges being spaced apart the length of the driving stroke of said pusher bar, a succession of said gripping heads being incrementally advanced by said driving ledges during the driving strokes of said pusher bar, and a twisting yoke rotatable about a vertical axis, said third driving ledge at the end of the driving stroke of said pusher bar slidably positioning a gripping head previously advanced by said driving ledges into said twisting yoke.

10. Apparatus according to claim 9 wherein said extractor pin is rotatable, and means for rotating said twisting yoke following termination of said driving stroke, whereby a gripping head positioned in said twisting yoke rotates said extractor pin to break the frozen bond and release the frozen product slab.

11. Apparatus according to claim 9 wherein said extractor pin is rotatable and is provided with a flat longitudinal surface that is coplanar before rotation with the end surface of the frozen product slab, and an opposed arcuate surface freeze-bonded to the slab, and means for rotating said twisting yoke substantially 180 degrees to break said frozen bond and to remove said arcuate surface from the slab.

12. Apparatus according to claim 11 and a semi-circular flat disc secured to the lower end of said extractor pin, said disc having a linear edge coincident with the flat surface of said pin and an arcuate edge of larger radius than the arcuate surface of said pin to form a lateral ledge which extends into the frozen slab before rotation of said extractor pin.

13. In a continuous freezing machine including a frame, an open top mold having upright walls, a driven conveyor on said frame for moving said mold through a plurality of processing stations, the improvement comprising an extractor pin removably positioned in said mold, said extractor pin including a gripping head positioned above the open top of the mold and a depending rotatable shank portion lying within the mold, said shank portion being half-round in cross section and having a flat side substantially coincident with an interior upright wall surface of the mold, and a semi-circular disc secured to said shank, said disc having an arcuate edge formed with a radius larger than the radius of said shank and forming a ledge projecting toward the central portion of the mold and lying beyond the half round surface of said shank.

14. In a continuous freezing machine including a frame, an open top mold having upright walls, and a driven conveyor on said frame for moving said mold through a brine tank for freezing a liquid product in the mold, the improvement comprising a substantially vertical extractor pin removably positioned in said mold, said extractor pin including a gripping head positioned above the open top of the mold and a depending shank portion secured to said gripping head and lying within the mold, and a semi-circular disc secured in perpendicular relation to said shank, said disc having a flat edge coincident with the longitudinal axis of said shank and lying adjacent an interior wall surface of the mold, said disc having an arcuate edge defining a ledge projecting into the frozen product and said extractor pin being rotatable substantially 180 degrees about the longitudinal axis of said shank, the frozen product thus being removable from the mold by endwise withdrawal of said extractor pin from the mold with the product supported by said ledge, and removable from said extractor pin by rotating the pin to remove said disc from the frozen product.

15. In a continuous freezing machine including a frame, an endless intermittently driven conveyor chain mounted on said frame for movement in an elliptical path, a plurality of open top molds carried by the upper flight of said conveyor chain sequentially through a filling zone where a liquid product is filled in the molds, a freezing zone where the product in the molds is frozen into a single elongate slab, a defrosting zone where the frozen bond between the frozen slab and the mold is thawed, a slab handling zone where the frozen slab is removed from the mold, and a washing and sterilizing zone where the empty mold is washed and sterilized for refilling, the improvement comprising an extractor pin removably positioned in the end portions of each mold for eventual freeze-bonding into the product in the mold, each of said extractor pins including a gripping head positioned above the open top of the mold, a shank portion lying within the mold and a disc portion secured to said shank, said shank being half-round in cross section with a flat side adjacent a wall surface of the mold and an arcuate side embedded in the frozen product slab, said disc having an arcuate edge projecting inwardly beyond the arcuate side of said shank and also being embedded in the frozen slab, said shank being rotatable about an axis coincident with its flat side, means at said defrosting station for thawing the frozen bond between the mold and the frozen product slab, means at the defrosting station for gripping and elevating said extractor pins with the attached frozen slab, means for incrementally advancing the elevated extractor pins and slab in synchronism with the intermittent movements of said conveyor, means for rotating said extractor pins 180 degrees so that the extractor pins lie wholly outside and release the frozen slab, means for returning the slab-free extractor pins to a mold on the upper flight of said conveyor, and means for retaining the extractor pins in said mold while the mold is carried by said conveyor through said washing and sterilizing zone so that each mold is filled and emptied automatically and only sterile parts contact the frozen product slabs.

16. A continuous freezing machine comprising an elongate frame, an upwardly open mold extending across said frame, a mold conveyor mounted on said frame for incrementally moving said mold through a plurality of processing stations, a free extractor pin removably positioned in each lateral end portion of said mold, each of said pins having an upper head formed to be gripped for pin rotation, said pins having no mechanical bridging connection between them to provide a unobstructed gap between the pins when they are lowered after release of the slab, means for filling the mold with a product which is subsequently frozen onto said extractor pins, a mold defrost station, means for individually gripping the upper heads of said pins while the slab is in the mold at the defrost station and for elevating said pins and slab to remove the slab from the mold at said defrost station, a slab discharge station above said mold conveyor, means for advancing the elevated pins and slab to said discharge station, means at said discharge station for turning the heads of said pins to release the slab from the pins, pin return means for lowering the slab-free extractor pins into a mold on said conveyor, and slab catching means underlying said slab discharge station, said slab catching means lying within said gap between the pins to accommodate said lowering of the pins.

References Cited

UNITED STATES PATENTS

| 2,076,377 | 4/1937 | Loewenstein | 107—8 |
| 2,625,120 | 1/1953 | Eddy et al. | 107—8 |
| 3,335,579 | 8/1967 | Lampman | 62—345 |
| 3,403,639 | 10/1968 | Hirahara et al. | 107—8 X |

WILLIAM E. WAYNER, Primary Examiner

U.S. Cl. X.R.

62—73, 345, 356; 107—8